| (12) | United States Patent | (10) Patent No.: | US 7,275,844 B2 |
|---|---|---|---|
| | Watanabe | (45) Date of Patent: | Oct. 2, 2007 |

(54) GENERATOR POWERED BICYCLE HEADLAMP AND ELECTRICAL CIRCUIT

(75) Inventor: Masashi Watanabe, Tokyo (JP)

(73) Assignee: Akidenki Kabushikigaisya, Tokyo (JP)

( * ) Notice: Subject to any disclaimer, the term of this patent is extended or adjusted under 35 U.S.C. 154(b) by 209 days.

(21) Appl. No.: 10/516,513

(22) PCT Filed: Jun. 11, 2003

(86) PCT No.: PCT/JP03/07448

§ 371 (c)(1),
(2), (4) Date: Dec. 2, 2004

(87) PCT Pub. No.: WO03/104069

PCT Pub. Date: Dec. 18, 2003

(65) Prior Publication Data

US 2005/0243545 A1    Nov. 3, 2005

(30) Foreign Application Priority Data

Jun. 11, 2002  (JP)  .............................. 2002-204822
May 7, 2003   (JP)  .............................. 2003-165772

(51) Int. Cl.
*B62J 6/06*    (2006.01)

(52) U.S. Cl. ...................... 362/473; 362/475; 362/192; 362/308; 310/73

(58) Field of Classification Search ................ 362/192, 362/473, 475, 244, 245; 310/73; 340/432
See application file for complete search history.

(56) References Cited

U.S. PATENT DOCUMENTS 3,751,710 A * 8/1973 Carmichael et al. ........ 362/193
3,971,977 A * 7/1976 Hirt et al. ................... 362/192
4,211,955 A * 7/1980 Ray ............................. 315/53
4,227,105 A * 10/1980 Kumakura ................... 310/153
4,727,289 A * 2/1988 Uchida ........................ 315/71
4,796,972 A * 1/1989 Thomas et al. ............. 362/473
5,003,288 A * 3/1991 Wilhelm .................. 340/457.2
5,015,918 A * 5/1991 Copeland .................... 362/473
5,463,280 A * 10/1995 Johnson ...................... 315/187
5,515,253 A * 5/1996 Sjobom ....................... 362/244

(Continued)

FOREIGN PATENT DOCUMENTS

JP      129279/1987      8/1987

(Continued)

*Primary Examiner*—Jong-Suk (James) Lee
*Assistant Examiner*—Ismael Negron
(74) *Attorney, Agent, or Firm*—Oblon, Spivak, McClelland, Maier & Neustadt, P.C.

(57) ABSTRACT

A bicycle headlamp including: a rotor having a plurality of magnet plates attached to spokes of a bicycle wheel, each magnet plate including a plurality of magnets disposed at regular circumferential spacings with alternating south and north poles; and a stator including a power-generating coil disposed in a fixed position to face the magnetic pole faces of the magnet plates. A case includes at least a headlamp electrical circuit for establishing resonance with a certain relative speed of the magnets by means of the power-generating coil and a capacitor connected in series, and for rectifying, smoothing out, and outputting electric power obtained from the power-generating coil. Also included are a light-emitting diode and a condenser lens for focusing light emitted from the light emitting diode in front of the bicycle and for illuminating the roadway.

10 Claims, 18 Drawing Sheets

U.S. PATENT DOCUMENTS

| | | | |
|---|---|---|---|
| 5,584,561 A * | 12/1996 | Lahos | 362/473 |
| 5,590,946 A * | 1/1997 | Jung | 362/475 |
| 5,667,290 A * | 9/1997 | Cioletti et al. | 362/473 |
| 5,803,574 A * | 9/1998 | Szaniszlo | 362/551 |
| 5,850,126 A * | 12/1998 | Kanbar | 315/200 A |
| 5,896,093 A * | 4/1999 | Sjobom | 340/815.75 |
| 5,998,925 A * | 12/1999 | Shimizu et al. | 313/503 |
| 6,095,661 A * | 8/2000 | Lebens et al. | 362/184 |
| 6,170,968 B1 * | 1/2001 | Caswell | 362/473 |
| 6,565,242 B2 * | 5/2003 | Dai | 362/473 |
| 6,578,994 B1 * | 6/2003 | Beyerlein | 362/490 |

FOREIGN PATENT DOCUMENTS

| | | |
|---|---|---|
| JP | 55774/1993 | 7/1993 |
| JP | 5-319333 | 12/1993 |
| JP | 35278/1995 | 6/1995 |
| JP | 08-058651 | 3/1996 |
| JP | 10-7052 | 1/1998 |

* cited by examiner (a)

(b)

(c) N ←→ S POLARIZATION DIRECTION

GENERATOR POWERED BICYCLE HEADLAMP AND ELECTRICAL CIRCUIT

TECHNICAL FIELD

The present invention relates to bicycle headlamps which include at least a rotor provided with magnets attached to spokes of a wheel of a bicycle, a stator provided with a power-generating coil mounted to face the rotor, a headlamp electrical circuit, a light-emitting diode, and a condenser lens, the light-emitting diode being lit by electricity generated by pedaling, and also relates to headlamp electrical circuits.

BACKGROUND ART

Conventional bicycle headlamps using an incandescent lamp receive power for providing illumination sufficient for nighttime cycling from a rotary generator, to which a rotary motion is transferred by a roller pressed against a side of a tire. This method exerts a large frictional resistance on the rotary motion, and the cyclist feels a drag while pedaling. Accordingly, cycling at night requires extra power. The conventional generator using the roller to be pressed against the side of the tire, however, must be turned on manually, and thus a trouble-free simple device has been needed.

The conventional method of pressing the roller against the side of the tire has problems. A first problem is that the roller pressed against the side of the tire while cycling at night incurs a frictional resistance on the rotary motion, causing the cyclist to feel that the pedals have become heavy.

A second problem is that illumination will decrease when cycling on a muddy road because mud getting in between the tire and the roller causes the roller to slide along the tire.

A third problem is the need to manually turn on and turn off the generator for cycling at night.

An object of the present invention is to provide a contactless, light-load bicycle headlamp and a headlamp electrical circuit that can solve the problems described above by adopting new technologies.

DISCLOSURE OF INVENTION

In order to achieve the object described above, a bicycle headlamp described in claim 1 of the present invention is characterized by including a rotor including a plurality of magnet plates attached to spokes of a bicycle wheel along the circumference of the wheel, each magnet plate having the form of an arc of a certain circle and including a plurality of magnets disposed at regular circumferential spacings with alternating south and north poles; a stator including a power-generating coil including a coil and an iron core disposed in a fixed position to face the magnetic pole faces of the magnet plates of the rotor; and a case containing at least a headlamp electrical circuit for establishing resonance at a frequency synchronized with a certain relative speed of the magnets by means of the power-generating coil of the stator and a capacitor connected in series with the power-generating coil and for rectifying, smoothing, and outputting electric power obtained from the power-generating coil, a light-emitting diode which is lit by the electric power supplied from the headlamp electrical circuit, and a condenser lens for focusing light emitted from the light-emitting diode in front of the bicycle and for illuminating the roadway.

A further feature of the present invention is a bicycle headlamp, wherein the stator has the magnet plates attached to the spokes of the bicycle along the circumference of the wheel, in a continuous ring shape or in separate positions.

A further feature of the present invention is a bicycle headlamp, wherein the light-emitting diode is a white light-emitting diode with a luminous intensity of 2 cd or higher, and the lens has such a focal length that a certain level of illumination is ensured at a specified distance.

A further feature of the present invention is a bicycle headlamp, wherein a plurality of light-emitting diodes are used; the lens is a dome-shaped lens disposed for each of the light-emitting diodes, the dome-shaped lens having a curvature, a diameter, and a thickness calculated to obtain a specified level of illumination in a specified circle at a specified distance by focusing light; and a reflector is provided on a flat-plate portion above the lens, by applying a treatment for producing diffused reflection, so that the approach of the bicycle can be noticed ahead of the bicycle.

A further feature of the present invention is a bicycle headlamp, wherein the stator, including the power-generating coil, the headlamp electrical circuit, the light-emitting diode, and the condenser lens are contained in the case as a unit.

A further feature of the present invention is a bicycle headlamp, wherein the headlamp electrical circuit, the light-emitting diode, and the condenser lens are contained in the case; and the stator, including the power-generating coil, is separately disposed outside the case.

In order to achieve the object described above, a headlamp electrical circuit of the present invention has a resonance circuit for establishing resonance at a frequency synchronized with a specified relative speed of the magnets, the resonance circuit including a power-generating coil of the stator and a capacitor connected in series with the power-generating coil, and a rectifying and smoothing circuit for rectifying and smoothing electric power obtained from the power-generating coil of the resonance circuit and for supplying the electric power to the light-emitting diode.

A further feature of the present invention is a headlamp electrical circuit, wherein the rectifying and smoothing circuit has a dc-dc converter for rectifying electric power obtained from the power-generating coil of the resonance circuit by means of a diode and for smoothing out the electric power by means of a smoothing capacitor, and a constant-current circuit for receiving a direct current from the dc-dc converter and supplying a constant current to the light-emitting diode, the constant-current circuit including at least two transistors, two resistors, and a capacitor.

A further feature of the present invention is a headlamp electrical circuit, wherein a light sensor and/or a manual switch is connected to the constant current circuit; and the constant-current circuit is configured to allow or interrupt current supply to the light-emitting diode in accordance with a sense signal from the light sensor, is configured to allow or interrupt current supply to the light-emitting diode in accordance with an on/off signal from the manual switch, or is configured to allow or interrupt current supply to the light-emitting diode in accordance with either or both of the signal from the light sensor and the signal from the manual switch.

BRIEF DESCRIPTION OF THE DRAWINGS

FIG. 4(*a*) is an enlarged front view of the magnet plate of the rotor; and FIG. 4(*b*) is an enlarged side view of the magnet plate of the rotor.

FIG. 5(*a*) is a perspective view of the magnet mounted on the magnet plate of the rotor; FIG. 5(*b*) is a front view showing the magnet mounted on the magnet plate of the rotor; and FIG. 5(*c*) is an enlarged front view of the magnet mounted on the magnet plate of the rotor.

FIG. 6(*a*) is a front view of the power-generating coil of the stator; and FIG. 6(*b*) is a side view of the power-generating coil of the stator.

FIG. 11(*a*) is a side view of the condenser lenses; FIG. 11(*b*) is a rear view of the condenser lenses; and FIG. 11(*c*) is a front view of the condenser lenses.

FIG. 13(*a*) shows plots obtained from the test circuit including the resonant rectifier circuit; FIG. 13(*b*) shows plots obtained from the test circuit including the double-voltage rectifier circuit; and FIG. 13(*c*) shows plots obtained from the test circuit including the conventional full-wave rectifier circuit.

BEST MODE FOR CARRYING OUT THE INVENTION

Embodiments of the present invention will be described with reference to the figures.

FIGS. 1 to 17 are views showing a bicycle headlamp and a headlamp electrical circuit according to a first embodiment of the present invention.

Figure 1:
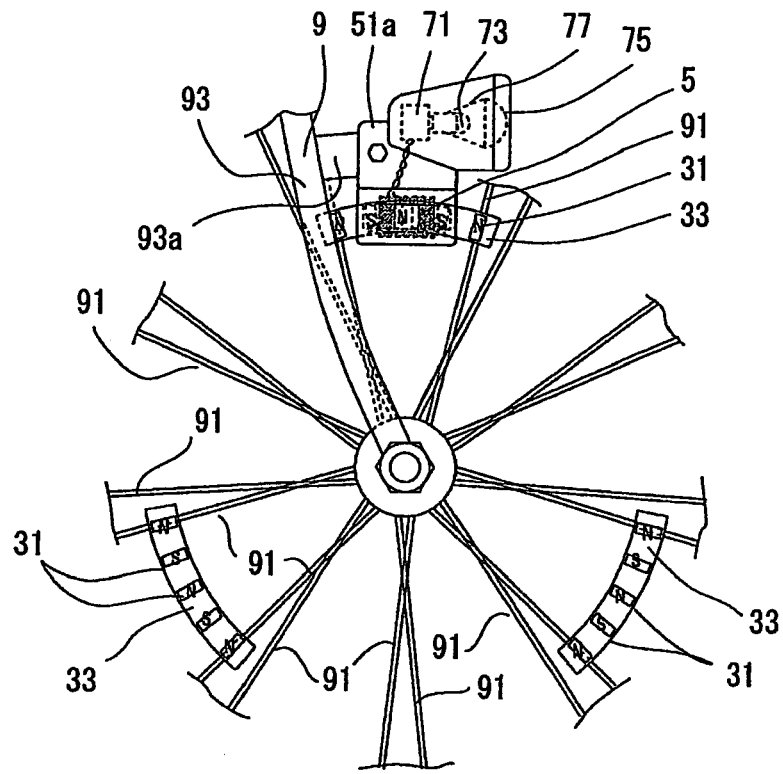
FIG. 1 is a view showing a bicycle headlamp according to a first embodiment of the present invention, namely, a side view showing a plurality of magnet plates attached to spokes of a bicycle wheel at particular spacings.

FIG. 1 is a view showing the bicycle headlamp according to the first embodiment of the present invention, namely, a side view showing a plurality of magnet plates attached to spokes of a bicycle wheel at particular spacings.

Figure 2:
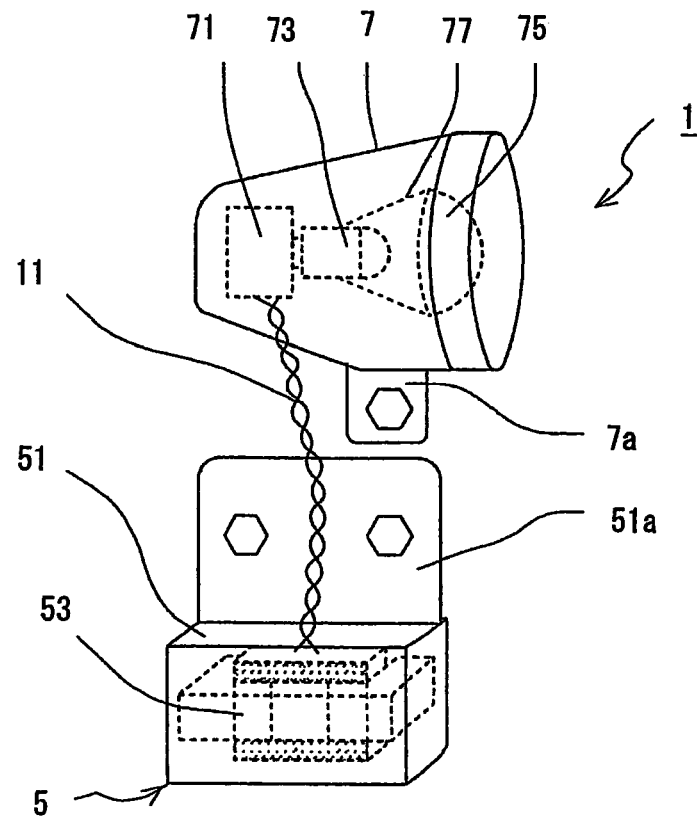
FIG. 2 is a perspective view showing a contactless, light-load bicycle headlamp according to the first embodiment of the present invention.

FIG. 2 is a perspective view showing the bicycle headlamp according to the first embodiment of the present invention, in which a stator, including a power-generating coil, is separated from a case.

Figure 3:
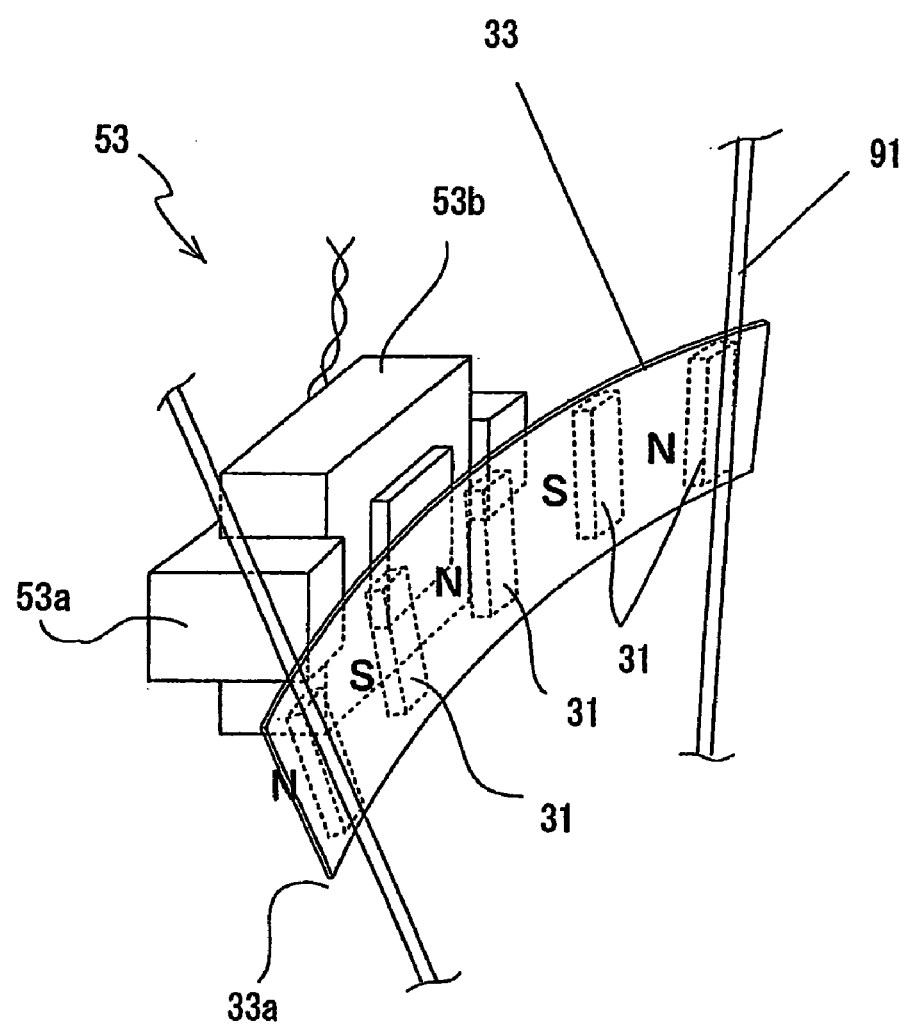
FIG. 3 is an enlarged perspective view showing a rotor and a stator of the bicycle headlamp according to the first embodiment of the present invention.

FIG. 3 is an enlarged perspective view showing a rotor and the stator of the bicycle headlamp according to the first embodiment of the present invention.

Figure 4:
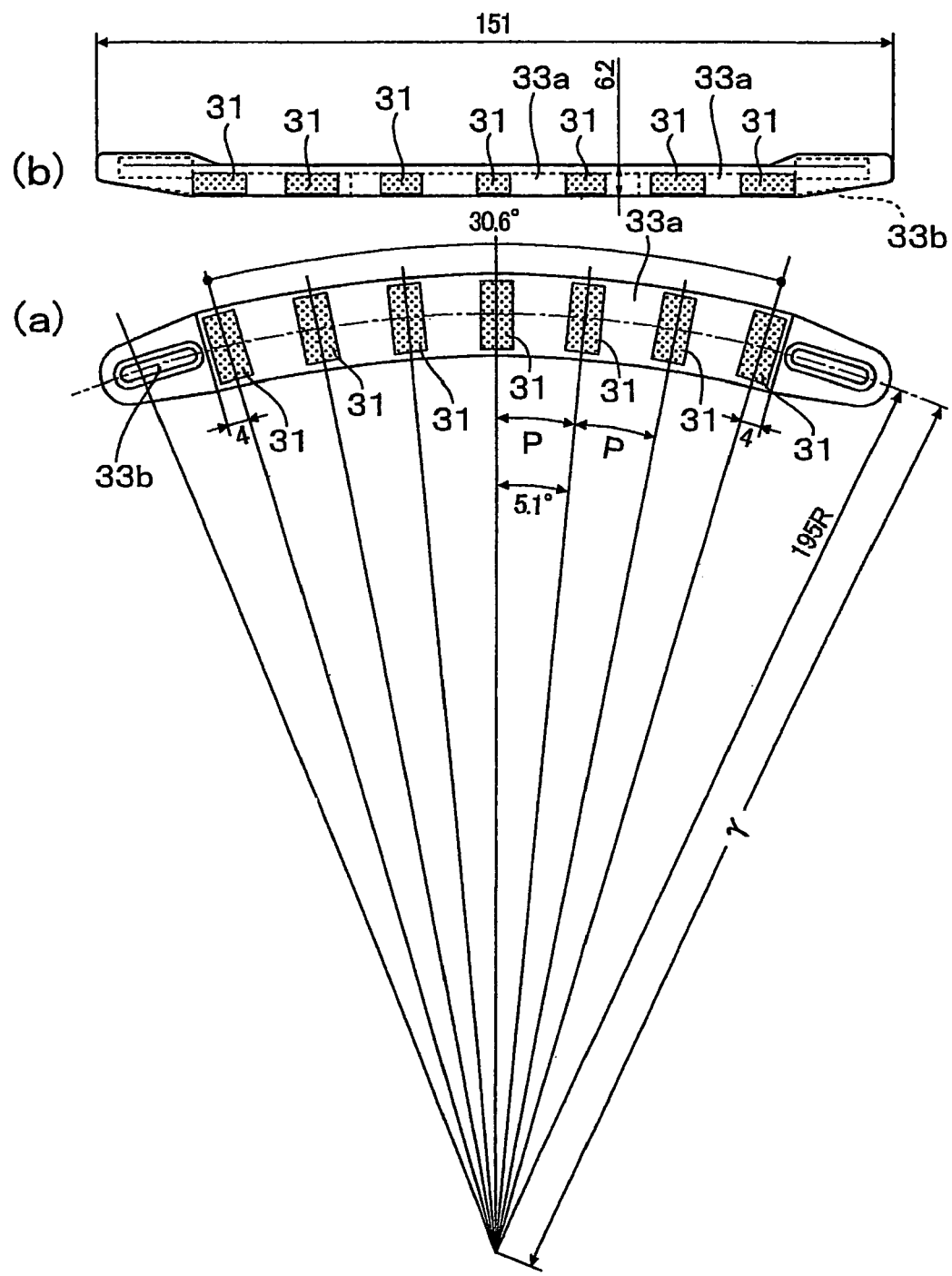
FIG. 4 shows enlarged views of a part of the rotor of the bicycle headlamp according to the first embodiment of the present invention.

FIG. 4 shows enlarged views of a part of the rotor of the bicycle headlamp according to the first embodiment of the present invention: FIG. 4(*a*) is an enlarged front view of the magnet plate of the rotor; and FIG. 4(*b*) is an enlarged side view of the magnet plate of the rotor.

Figure 5:
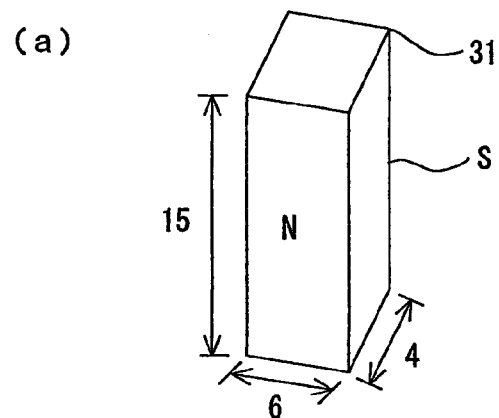
FIG. 5 shows enlarged views of a magnet mounted on the magnet plate of the rotor of the bicycle headlamp according to the first embodiment of the present invention.
Figure 5:
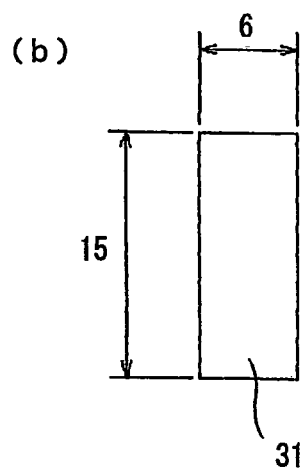
Figure 5:
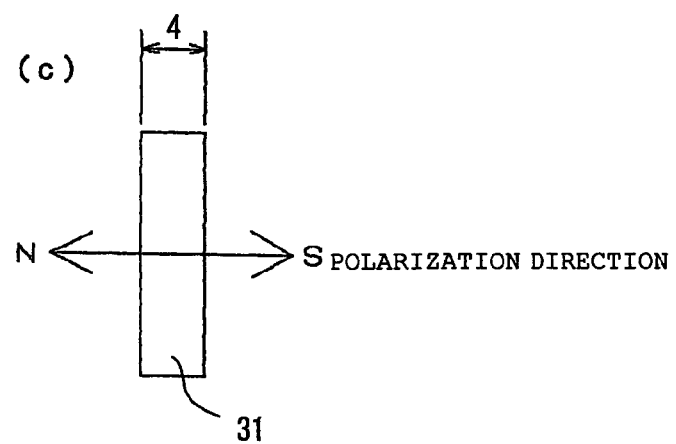

FIG. 5 shows enlarged views of a magnet mounted on the magnet plate of the rotor of the bicycle headlamp according to the first embodiment of the present invention: FIG. 5(*a*) is a perspective view of the magnet mounted on the magnet plate of the rotor; FIG. 5(*b*) is a front view showing the magnet mounted on the magnet plate of the rotor; and FIG. 5(c) is an enlarged front view of the magnet mounted on the magnet plate of the rotor.

Figure 6:
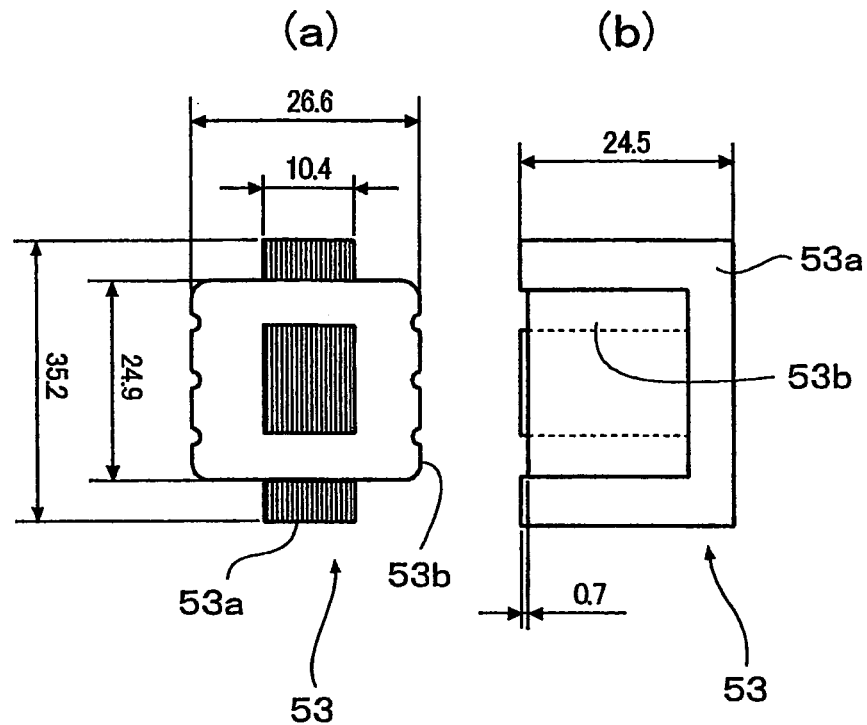
FIG. 6 shows enlarged views of a power-generating coil of the stator of the bicycle headlamp according to the first embodiment of the present invention.

FIG. 6 shows enlarged views of a power-generating coil of the stator of the bicycle headlamp according to the first embodiment of the present invention: FIG. 6(a) is a front view of the power-generating coil of the stator; and FIG. 6(b) is a side view of the power-generating coil of the stator.

Figure 7:
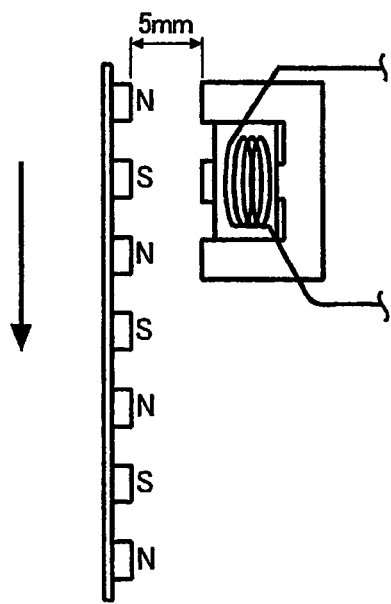
FIG. 7 is a view showing the positional relationship between the teeth of the power-generating coil of the stator and the individual magnets on the magnet plate of the rotor, of the bicycle headlamp according to the first embodiment of the present invention.

FIG. 7 is a view showing the positional relationship between the teeth of the power-generating coil of the stator and the individual magnets on the magnet plate of the rotor, of the bicycle headlamp according to the first embodiment of the present invention.

Figure 8:
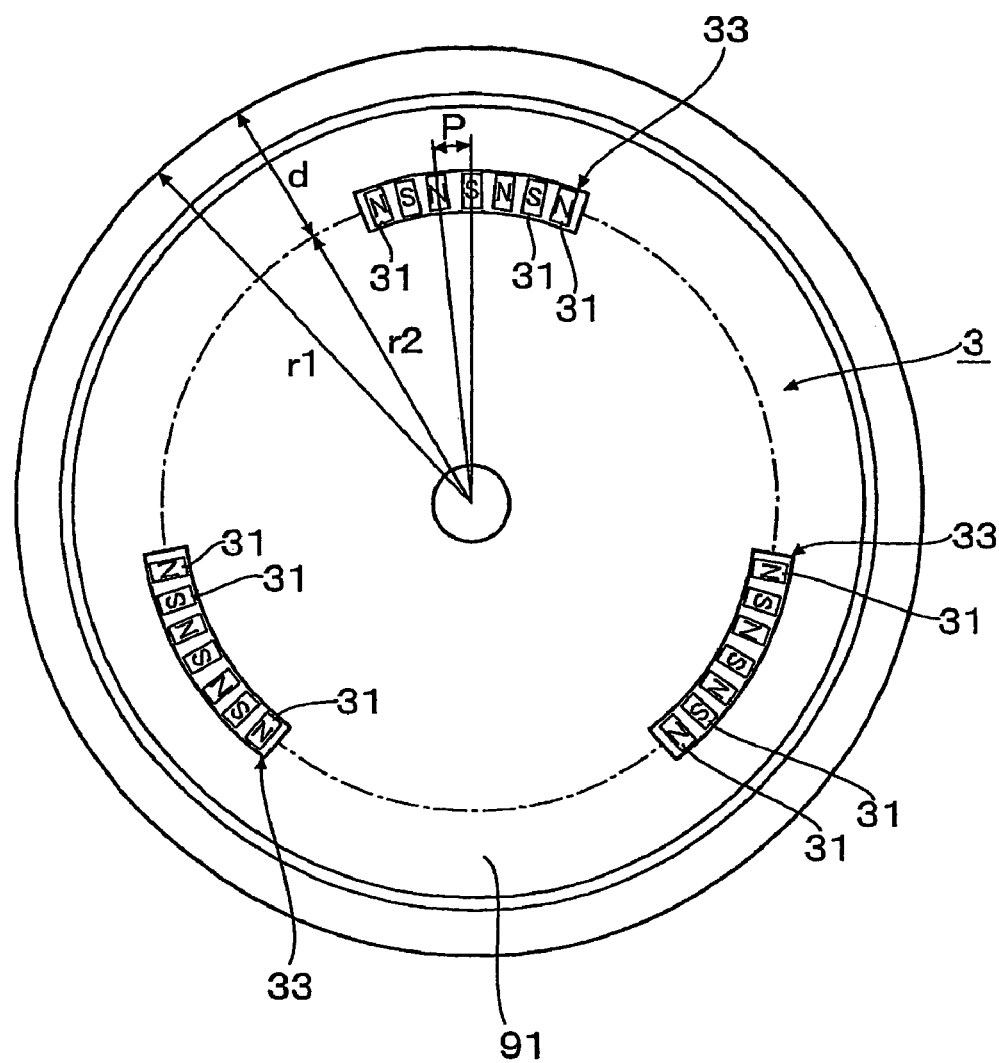
FIG. 8 is a view showing the relationship among the position of the rotor attached on the spokes of the bicycle wheel, of the bicycle headlamp according to the first embodiment of the present invention, the cycling speed, and the frequency of the generated power.

FIG. 8 is a view showing the relationship among the position of the rotor attached to the spokes of the bicycle wheel, of the bicycle headlamp according to the first embodiment of the present invention, the cycling speed, and the frequency of the generated power.

Figure 9:
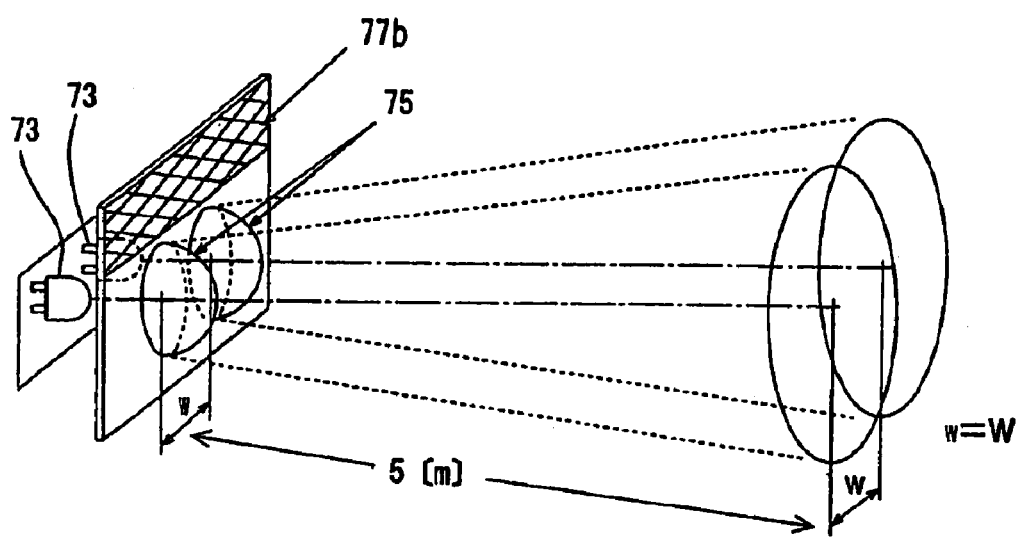
FIG. 9 is a perspective view showing the structure of the headlamp and the illumination state, of the bicycle headlamp according to the first embodiment of the present invention.

FIG. 9 is a perspective view showing the structure of the lens portion of the headlamp and the state of illumination, of the bicycle headlamp according to the first embodiment of the present invention.

Figure 10:
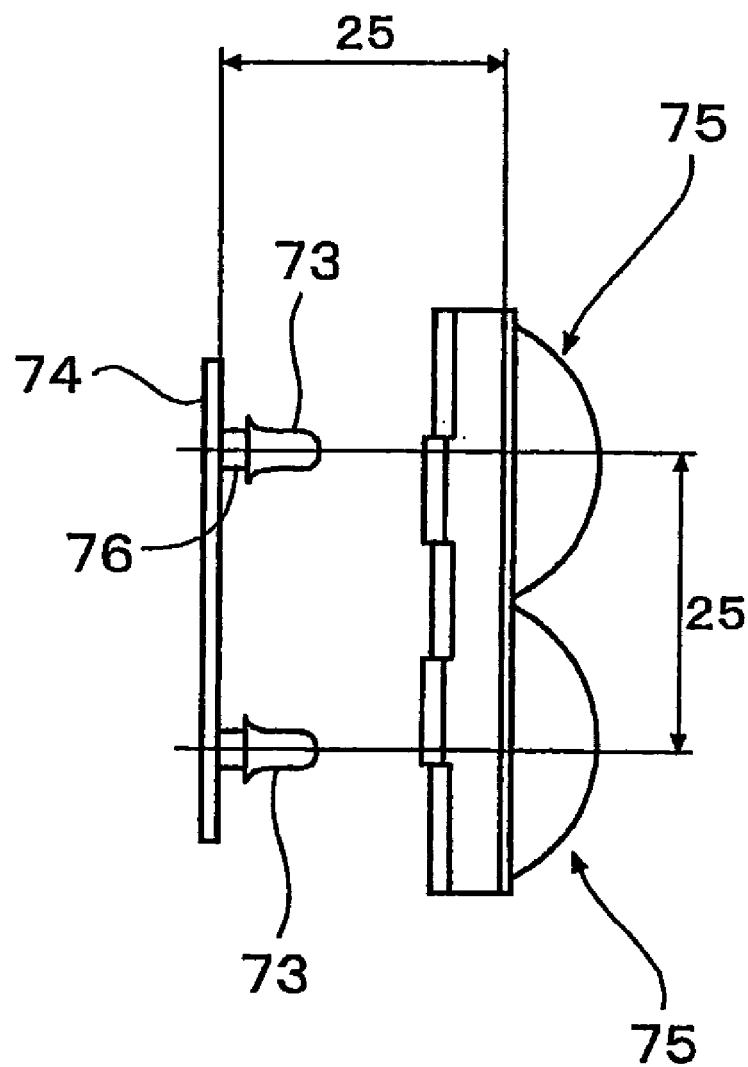
FIG. 10 is a view showing the positional relationship between light-emitting diodes and condenser lenses of the bicycle headlamp according to the first embodiment of the present invention.

FIG. 10 is a view showing the positional relationship between light-emitting diodes and condenser lenses of the bicycle headlamp according to the first embodiment of the present invention.

Figure 11:
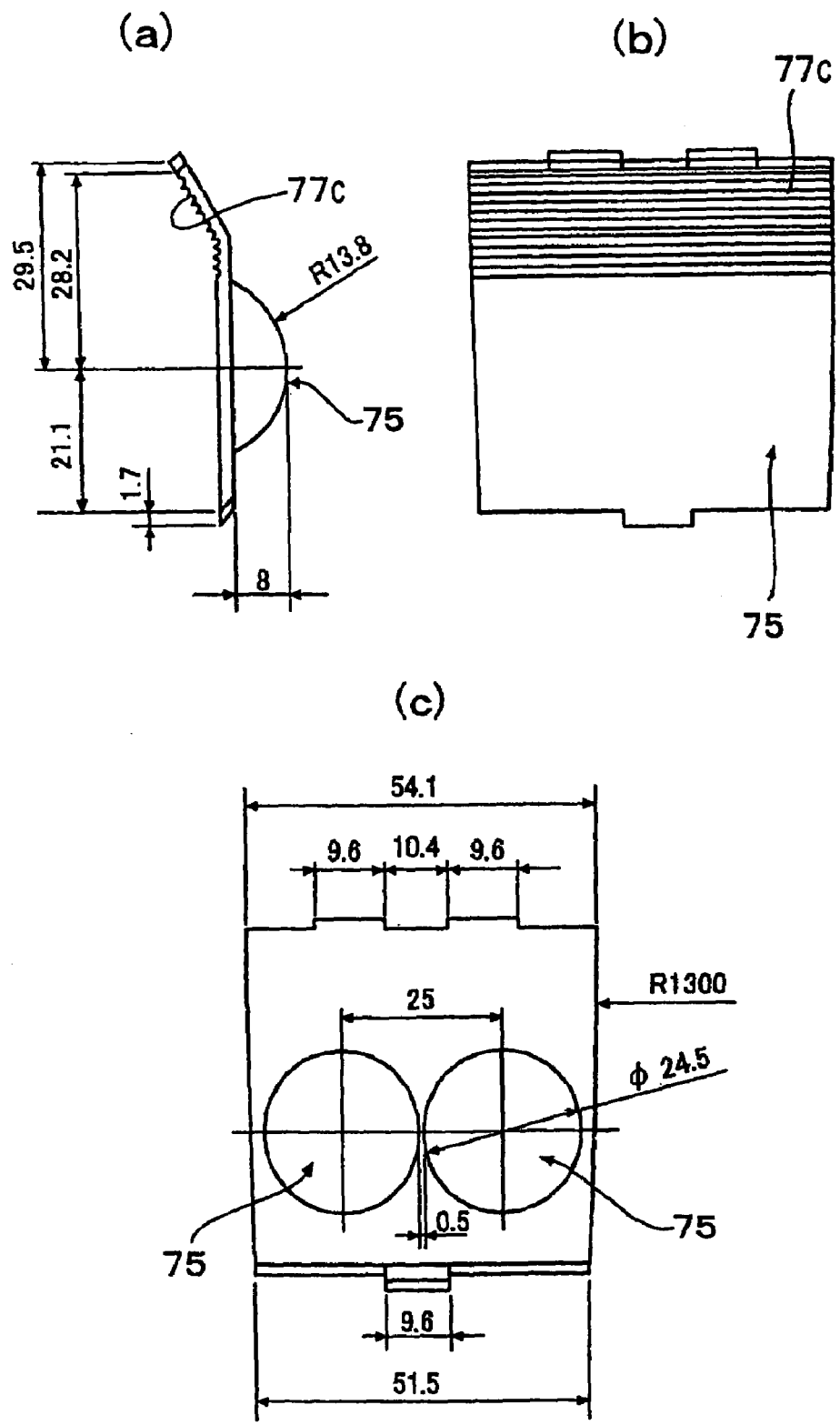
FIG. 11 shows views of the structure of the condenser lenses used in the bicycle headlamp according to the first embodiment of the present invention.

FIG. 11 shows views of the structure of the condenser lenses used in the bicycle headlamp according to the first embodiment of the present invention: FIG. 11(a) is a side view of the condenser lenses; FIG. 11(b) is a rear view of the condenser lenses; and FIG. 11(c) is a front view of the condenser lenses.

A bicycle headlamp 1 according to the first embodiment of the present invention can be broadly divided into a rotor 3, a stator 5, and a case 7, as shown in FIGS. 1 and 2. The case 7, which will be described later in detail, contains at least a headlamp electrical circuit 71, a light-emitting diode 73, a condenser lens 75, and a reflector 77.

The rotor 3 includes a plurality of magnet plates 33 attached to spokes 91 of a wheel of a bicycle 9 at particular spacings along the circumference of the wheel, each magnet plate having the form of an arc of a certain circle and including a plurality of magnets 31 disposed at regular circumferential spacings with alternating south and north poles.

The magnet plate 33 has a flat base plate 33a having the form of an arc of a certain circle of radius r, a plurality of magnets 31 disposed on the flat base plate 33a at regular circumferential spacings with alternating south and north poles, and mounting holes 33b provided in both ends of the flat base plate 33a, as shown in FIGS. 4(a) and 4(b). The flat base plate 33a is made of a high-permeability material such as iron, preferably-high-permeability silicon steel. The magnets 31 mounted on the magnet plate 33 each have a length of 15 mm, a width of 6 mm, and a thickness of 4 mm, for instance, as shown in FIGS. 5(a) to 5(c), and are polarized in the direction of the thickness. The magnets 31 used in this embodiment are made of Neodymium 40, which has a coercive force of 3200 to 3500 Gauss (G).

With the magnet plates 33 attached to the wheel spokes 91 of the bicycle 9 at particular spacings, as shown in FIG. 1, the rotor 3 and the stator 5 enable intermittent power generation.

The stator 5 includes a case 51 of a power-generation unit with a mounting block 51a and a power-generating coil 53 disposed inside the case 51 of the power-generation unit. When the mounting block 51a of the case 51 of the power-generation unit of the stator 5 is mounted on a fixed bracket 93a of a front fork 93 of the bicycle 9, as shown in FIG. 1, the power-generating coil 53 of the stator 5 faces the magnetic pole faces of the magnets 31 on the magnet plates 33 of the rotor 3 in a fixed position, as shown in FIG. 3.

The power-generating coil 53 of the stator 5 includes a substantially E-shaped iron core 53a and a coil 53b wound on the middle projecting part of the substantially E-shaped iron core 53a, as shown in FIGS. 2, 3, 6(a), and 6(b). The iron core 53a is made of materials such as an amorphous material and silicon steel.

The magnets 31 on the magnet plate 33 of the rotor 3 are disposed almost at the same spacings as the teeth of the iron core 53a in the power-generating coil 53 of the stator 5, as shown in FIG. 7. A constant spacing of 5 mm, for instance, is kept between the surface of the magnets 31 of the magnet plate 33 of the rotor 3 and the surface of the teeth of the iron core 53a of the power-generating coil 53 of the stator 5, as shown in FIG. 7.

The frequency of the generated power will be discussed below, supposing that the magnet plate 33 of the rotor 3 is attached to the wheel spokes 91 of the bicycle 9 in a certain positional relationship, with the magnets 31 of the magnet plate 33 of the rotor 3 and the teeth of the iron core 53a of the power-generating coil 53 of the stator 5 disposed as described above.

Radius r1 (millimeters) of the wheel of the bicycle 9 of size X inches is given by:

$$r1 = X/2 \times 25.4 \qquad (1)$$

If the radial distance between the rim of the wheel and the mounting position of the magnet plate 33 on the wheel spokes of the bicycle 9 is d (millimeters), the mounting position r2 (millimeters) is expressed as follows:

$$r2 = r1 - d \qquad (2)$$

If d is 135 (position of mounting hole of the conventional roller-type bicycle generator), the frequency f (Hz) of the generated power is calculated as follows:

$$f = (V \times 10^6 \times 2\pi \times r2)/(7200\pi \times r1 \times 2p) \qquad (3)$$

where V is the cycling speed (km/h) of the bicycle 9, and p is the pitch (mm) of the magnets 31.

The frequency f of the generated power with the bicycle 9 of size 24 inches, 26 inches, and 28 inches can be calculated by substituting the following values of r1 and r2 into expression 3. For instance, when the bicycle 9 of size 24 inches, of which r1 is 305 mm and r2 is 170 mm, is traveling at a standard speed (equals 15 km/h hereafter), the frequency f of the generated power is 66.4 Hz. When the bicycle 9 of size 26 inches, of which r1 is 330 mm and r2 is 195 mm, is traveling at the standard speed, the frequency f of the generated power is 70.3 Hz. When the bicycle 9 of size 28 inches, of which r1 is 355 mm and r2 is 220 mm, is traveling at the standard speed, the frequency f of the generated power is 73.9 Hz. The frequency f of the generated power described above or a frequency close thereto is obtained from the bicycle 9 traveling at the standard speed if the magnets 31 of the magnet plate 33 of the rotor 3 and the teeth of the iron core 53a of the power-generating coil 53 of the stator 5 are disposed in the positional relationship as described above.

The case 7 will be described next. As shown in FIG. 2, the case 7 contains at least the headlamp electrical circuit 71, the light emitting diode 73, and the condenser lens 75. The headlamp electrical circuit 71, including a capacitor (described later) connected in series with the power-generating coil 53 of the stator 5, can produce resonance at a frequency synchronized with a certain relative speed of the magnets 31 of the rotor 3 and can rectify, smooth, and output power obtained from the power-generating coil 53. The light-emitting diode 73 is lit by the power supplied from the headlamp electrical circuit 71. The condenser lens 75 focuses light produced by the light-emitting diode 73 in front of the bicycle 9 and illuminates the roadway in front.

The headlamp electrical circuit 71 in the case 7 and the power-generating coil 53 of the stator 5 are mutually connected by an electrical wire 11, as shown in FIG. 2.

It is preferred that the light-emitting diode 73 contained in the case 7 be a bullet-shaped white light-emitting diode with a luminous intensity of 2 cd or higher (NSPW312BS or NSPW300BS of Nichia Corporation) used under normal conditions. It is most favorable that a bullet-shaped white light-emitting diode with a luminous intensity of 6 cd or higher (NSPW500BS of Nichia Corporation) be used under normal voltage and current conditions. The condenser lens 75 has such a focal length that a certain level of illumination is ensured at a specified distance.

More specifically, in this embodiment, two (a plurality of) light-emitting diodes 73 are used, and two condenser lenses 75 are provided in the form of a dome. The two dome-shaped condenser lenses 75 are aligned with the light-emitting diodes 73, as shown in FIGS. 10 and 11.

Each dome-shaped condenser lens 75 has a curvature, a diameter, and a thickness as indicated in FIGS. 10 and 11, that are calculated to obtain a certain level of illumination by focusing light in a specified circle at a specified distance, as shown in FIG. 9. A reflector 77b or 77c is provided on a flat-plate portion above the condenser lens 75, as shown in FIGS. 9, 11(a), and 11(b), by applying a treatment for producing diffused reflection to a component of the lens. The reflector 77b or 77c makes it easier for other road users located ahead of the bicycle 9 to notice the approach of the bicycle 9. More specifically, the optical axes of the light-emitting diodes 73 are aligned with the optical axes of the dome-shaped condenser lenses 75 so that light is gathered efficiently.

The bicycle headlamp 1 according to the first embodiment of the present invention is designed to emit light of at least 5 lux in a circle having a radius of 30 cm at a distance of 5 m ahead of the bicycle at the standard cycling speed. The lens is shaped so that an object of about 10 cm can be easily recognized at a distance of 10 m. These conditions comply with a Japanese Industrial Standard (JIS) standard on bicycle headlamps. In order to satisfy those requirements, the condenser lens 75 has a thickness of about 10 mm, a curvature of 13.8, and a diameter of 24.5 mm, for instance. The distance w between the axes of the two dome-shaped condenser lenses 75 and the distance W between the axes of two circles of light produced by the dome-shaped lenses at a certain distance (5 m, for instance) have a relationship expressed by w=W.

As has been described above, the reflector 77b or 77c is provided above the condenser lenses 75, as shown in FIGS. 9, 11(a), and 111(b), by applying a treatment for producing diffused reflection to the plate component of the lens. The reflector 77b or 77c makes it easier for other road users located ahead of the bicycle 9 to notice the approach of the bicycle 9.

The bicycle headlamp 1 uses a resonant rectifier circuit, as has been described above. The resonant rectifier circuit will next be compared with other types of rectifier circuits.

Figure 12:
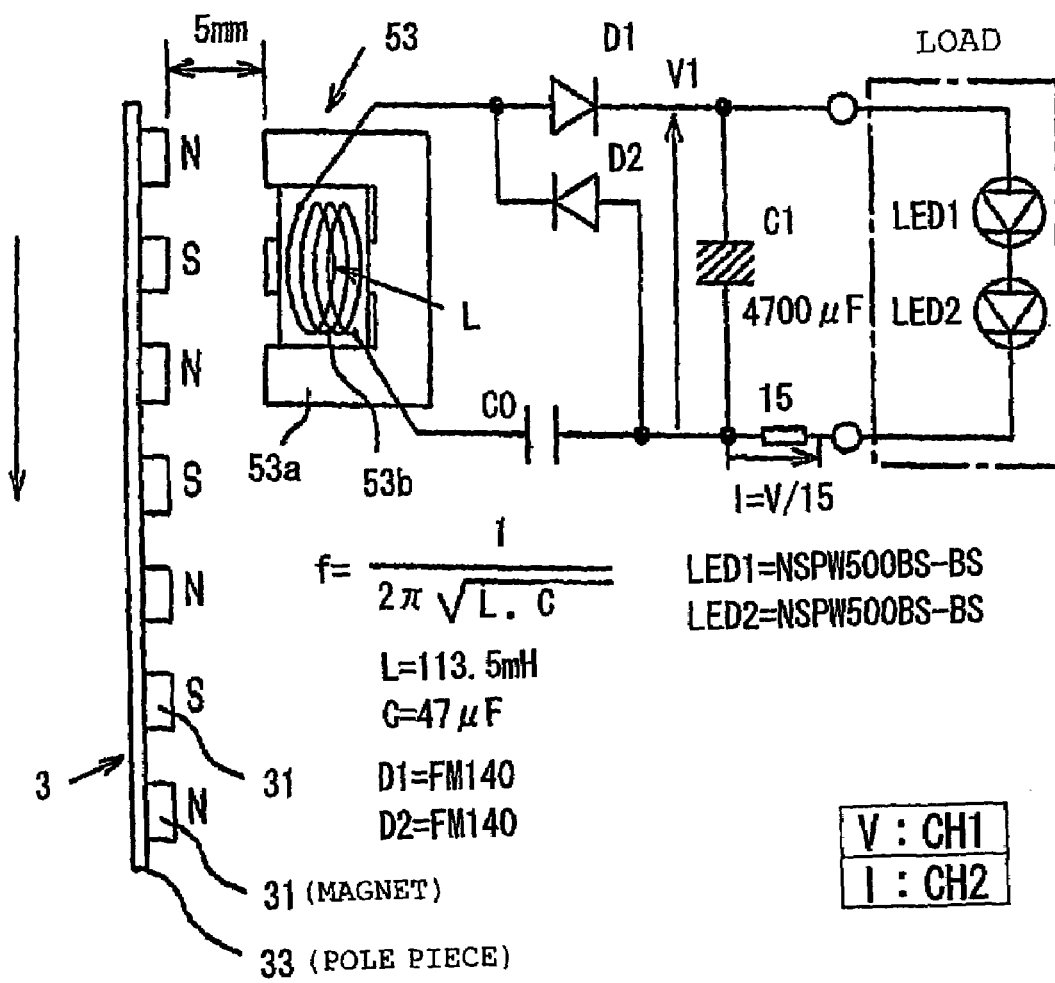
FIG. 12 is a view showing a test circuit including a resonant rectifier circuit used in the bicycle headlamp 1 according to the first embodiment of the present invention.

FIG. 12 is a view showing a test circuit including the resonant rectifier circuit used in the bicycle headlamp 1 according to the first embodiment of the present invention. The test circuit shown in FIG. 12 includes the-following: the rotor denoted by the reference character 3, the magnets denoted by the reference character 31, the magnet plate denoted by the reference character 33, the power-generating coil denoted by the reference character 53, the iron core denoted by the reference character 53a, and the coil denoted by the reference character 53b. A capacitor C0 is connected in series with a diode D2, and they are connected to both ends of the power-generating coil 53b, as shown in FIG. 12. The cathode of the diode D2 is connected to the anode of a diode D1, and the cathode of the diode D1 is connected to one end of a parallel circuit of a load and a smoothing capacitor C1. The other end of the parallel circuit of the load and the smoothing capacitor C1 is connected to the anode of diode D2. A 15-ohm resistor and two light-emitting diodes used in the present invention are connected in series, and this circuit is connected in the forward-bias direction as the load.

Figure 13A:
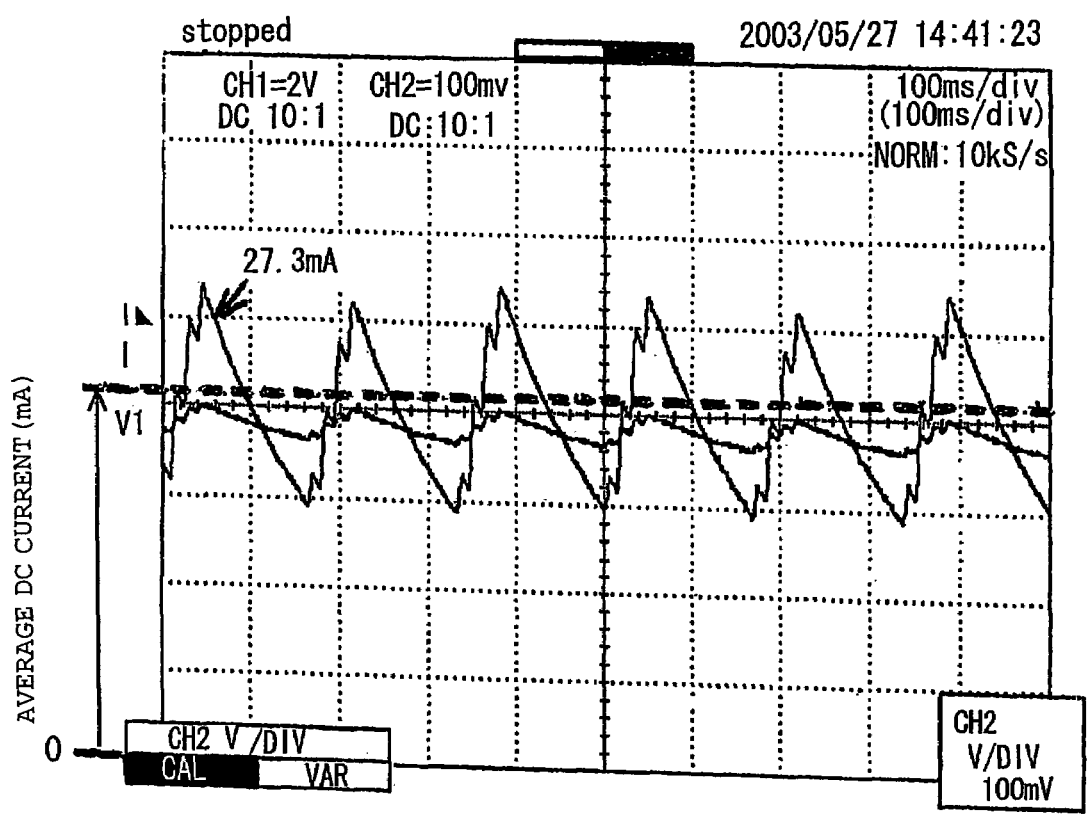
FIG. 13 shows characteristic plots representing results obtained from the test circuit including the resonant rectifier circuit, which is used in the bicycle headlamp 1 according to the first embodiment of the present invention, results obtained from a test circuit including a conventional double-voltage rectifier circuit, and results obtained from a test circuit including a conventional full-wave rectifier circuit.
Figure 13B:
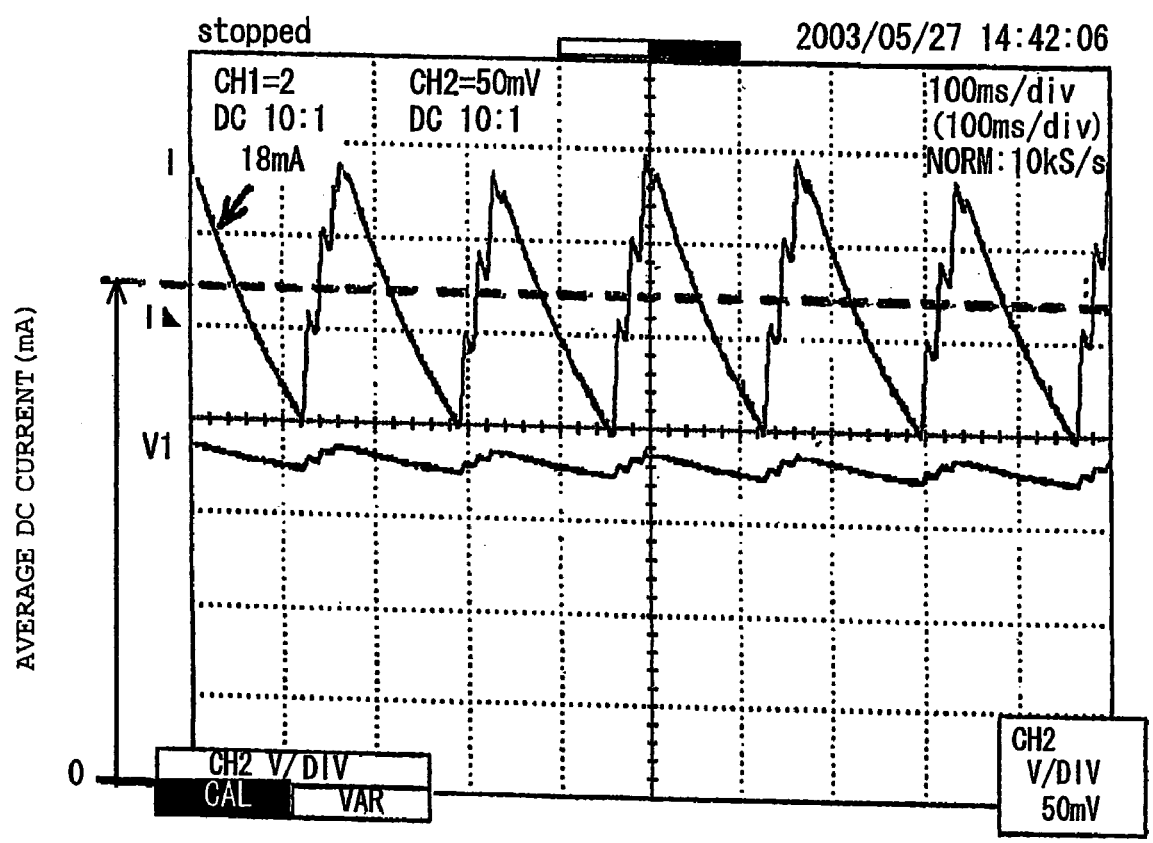
Figure 13C:
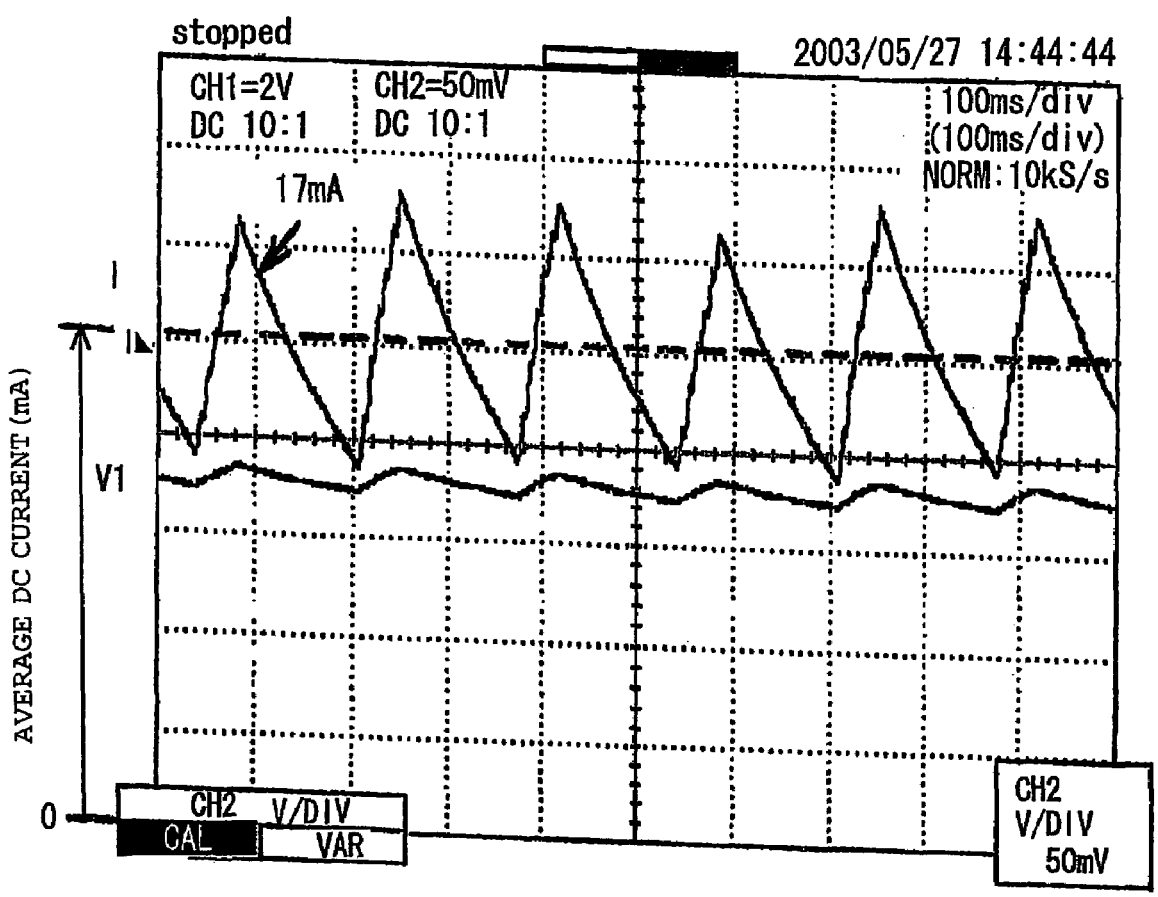

FIG. 13 shows characteristic plots representing results obtained from the test circuit including the resonant rectifier circuit used in the bicycle headlamp 1 according to the first embodiment of the present invention, a test circuit including a conventional double-voltage rectifier circuit, and a test circuit including a conventional full-wave rectifier circuit: FIG. 13(a) shows plots obtained from the test circuit including the resonant rectifier circuit; FIG. 13(b) shows plots obtained from the test circuit including the double-voltage rectifier circuit; and FIG. 13(c) shows plots obtained from the test circuit including the conventional full-wave rectifier circuit.

The average current I in FIG. 13(a) is larger than the average-current I in FIG. 13(b) or FIG. 13(c).

Figure 14:
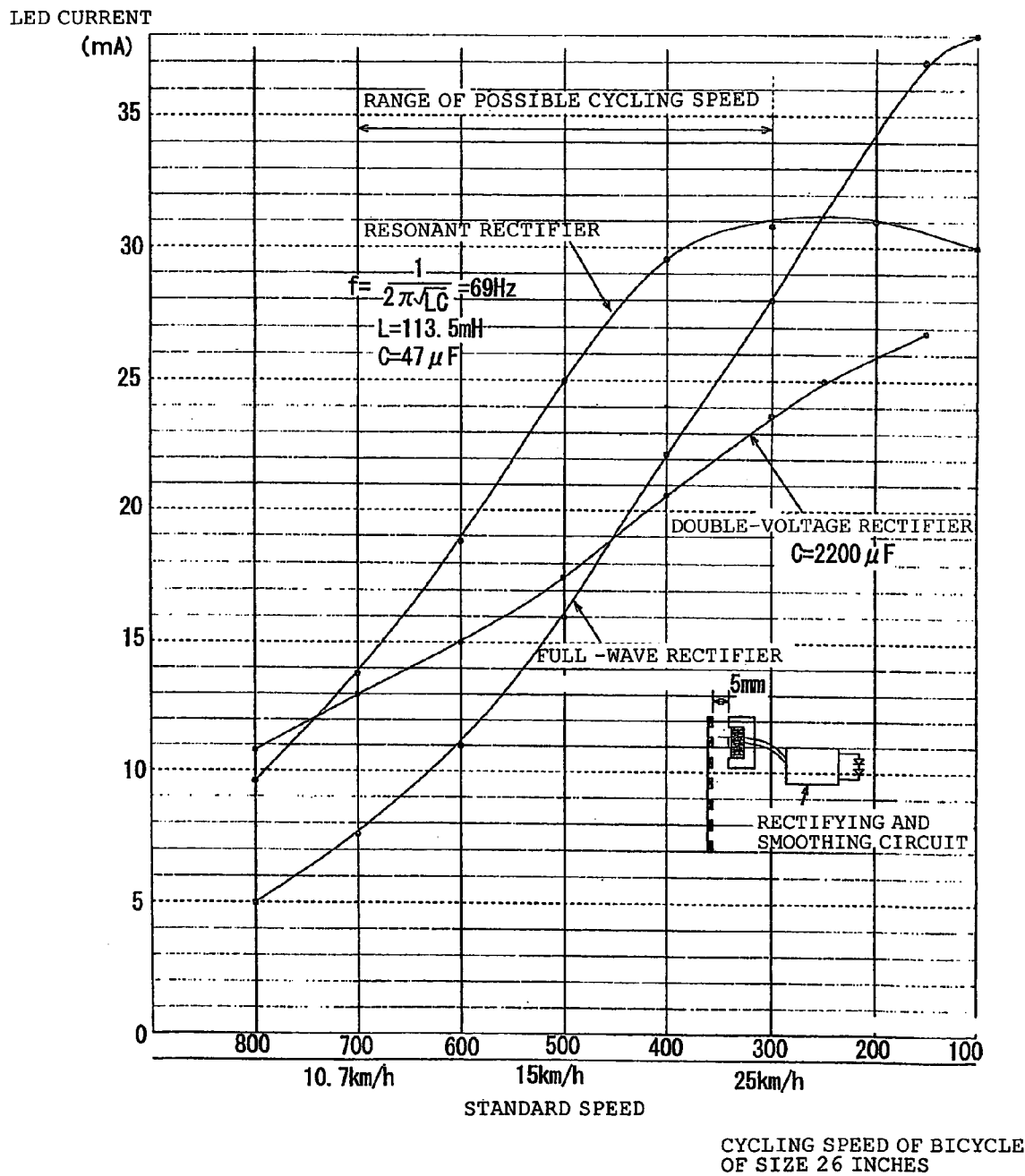
FIG. 14 is a view showing speed-current plots representing the relationship between the current observed in FIG. 13 and the cycling speed.

The relationship between the current obtained as described above and the cycling speed of the bicycle 9 is represented by the speed-current plots shown in FIG. 14. The horizontal axis indicates the speed in km/h, and the vertical axis indicates the current flowing through the load.

The FULL-WAVE RECTIFIER plot shown in FIG. 14 indicates that when the full-wave rectifier circuit is used, a small current is obtained at a low cycling speed, and the current increases in proportion to the cycling speed.

The DOUBLE-VOLTAGE RECTIFIER plot shown in FIG. 14 indicates that a larger current can be obtained at a low cycling speed with the double-voltage rectifier circuit than with the full-wave rectifier circuit or the resonant rectifier circuit, and the current obtained at an increased cycling speed is smaller than that with the two other types of circuits.

If the resonant rectifier circuit is used in the bicycle headlamp according to the first embodiment of the present invention, the current obtained at a low speed is smaller than the current obtained with the double-voltage rectifier, as the RESONANT RECTIFIER plot in FIG. 14 shows. However, at a speed exceeding a certain level (about 11 km/h in the figure, for example), the current increases with an increase in speed, and exceeds the current obtained with the double-voltage rectifier. In addition, when another level of speed (26 km/h in the figure, for example) is exceeded, the current does not exceed a certain limit. That is, a speed exceeding a certain level does not cause the generated power to increase in an analogous fashion, so that an excessively large current will not flow through the load.

These characteristics indicate that the resonant rectifier circuit used in the bicycle headlamp 1 according to the first embodiment of the present invention is effective.

It is easily understood that power is generated intermittently because the magnet plates 33 of the rotor 3 are disposed, as described above, at particular spacings on the wheel spokes 91 of the bicycle 9 in the bicycle headlamp and the headlamp electrical circuit using the resonant rectifier circuit. A headlamp electrical circuit according to a second embodiment of the present invention appropriately smoothes out even the power generated intermittently, as described above, and can supply direct-current power containing a very small amount of ripple. The structure and the effects will be described below.

FIGS. 15 to 19 are views provided to describe the headlamp electrical circuit according to the second embodiment of the present invention.

Figure 15:
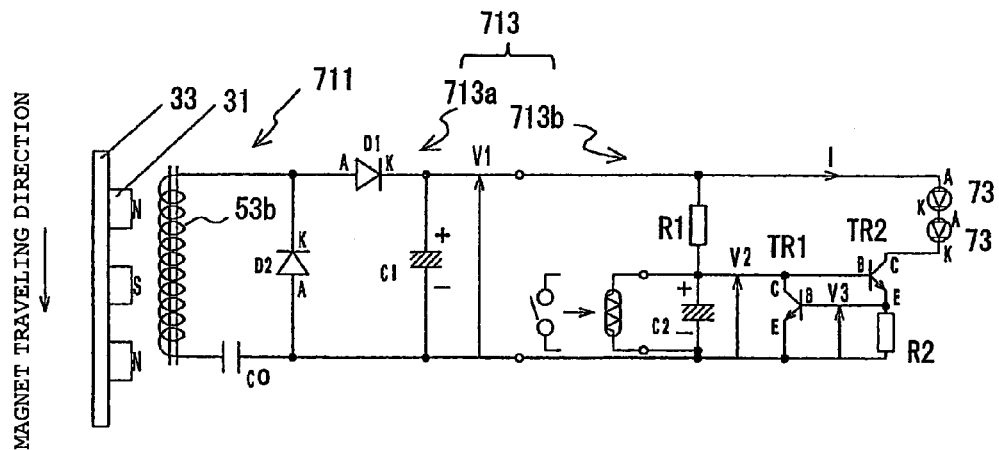
FIG. 15 is a schematic diagram showing a headlamp electrical circuit according to a second embodiment of the present invention.
Figure 16:
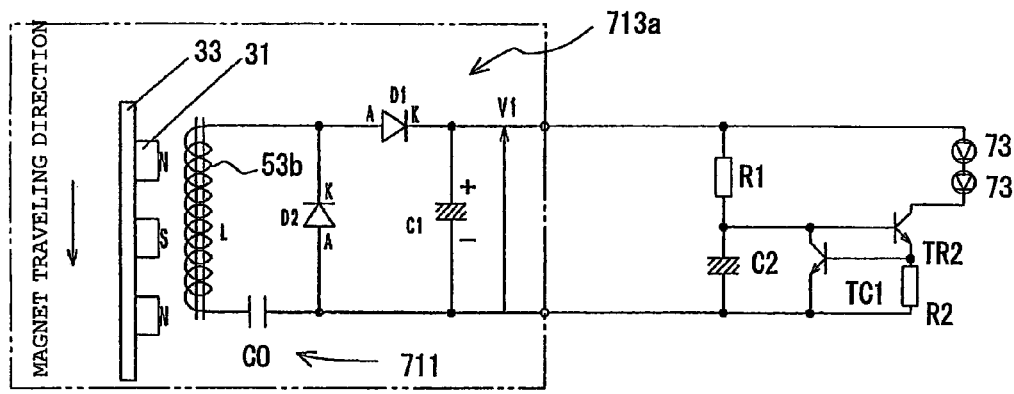
FIG. 16 is a schematic diagram showing a resonance circuit and a dc-dc converter of a rectifying and smoothing circuit, in the headlamp electrical circuit according to the second embodiment of the present invention.
Figure 17:
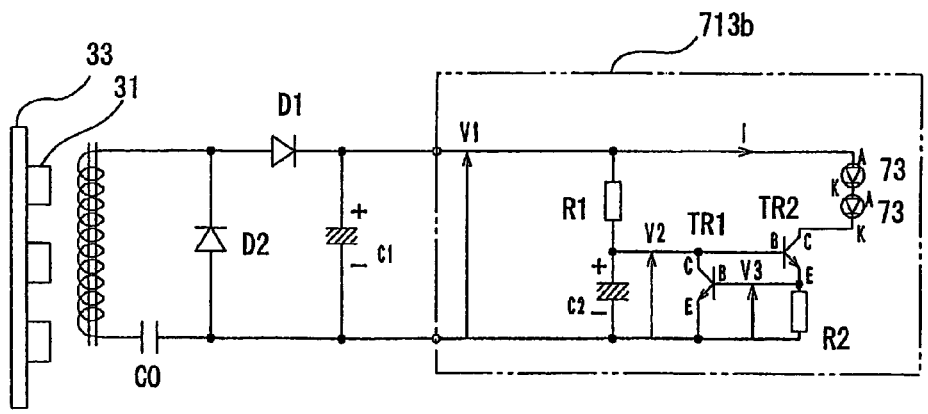
FIG. 17, is a schematic diagram showing a constant-current circuit in the headlamp-electrical circuit-according to the second embodiment of the present invention.

FIG. 15 is a schematic diagram showing the headlamp electrical circuit according to the second embodiment of the present invention. FIG. 16 is a schematic diagram showing a resonance circuit and a dc-dc converter of a rectifying and smoothing circuit, in the headlamp electrical circuit according to the second embodiment of the present invention. FIG. 17 is a schematic diagram showing a constant-current circuit in the headlamp electrical circuit according to the second embodiment of the present invention.

The headlamp electrical circuit 71 according to the second embodiment of the present invention can be broadly divided into a resonance circuit 711 and a rectifying and smoothing circuit 713, as shown in FIGS. 15, 16, and 17. The rectifying and smoothing circuit 713 can be divided into a dc-dc converter 713a and a constant-current circuit 713b, as shown in FIGS. 16 and 17.

The resonance circuit 711 includes the power-generating coil 53 of the stator 5 and capacitor C0 connected in series with the power-generating coil 53. The coil 53b of the power-generating coil 53 and capacitor C0 establish resonance at a frequency synchronized with a certain relative traveling speed of the magnets 31 in the direction indicated by the arrow shown in the figure (this has been explained with reference to FIG. 8).

The rectifying and smoothing circuit 713 is configured to rectify and smooth out the power obtained from the power-generating coil 53 of the resonance circuit 711 and to supply the power to the light-emitting diodes 73.

The dc-dc converter 713a of the rectifying and smoothing circuit 713 is configured to rectify the power obtained from the power-generating coil 53 of the resonance circuit 711 by means of diodes D1 and D2, and to smooth out the power by means of a smoothing capacitor C1.

The constant-current circuit 713b of the rectifying and smoothing circuit 713 includes at least two transistors TR1 and TR2, two resistors R1 and R2, and a capacitor C2, and is configured to receive the direct current obtained from the dc-dc converter 713a and to supply a certain amount of current to the light-emitting diodes 73.

The structures of the resonance circuit 711 and the dc-dc converter 713a will next be described in further detail, with reference to FIGS. 15 and 16. The capacitor C0 is connected in series with the power-generating coil 53 to form a series resonance circuit. The anode A of the diode D1 is connected to one end of the power-generating coil 53. One end of the capacitor C0 connected in series is connected to the anode A of the diode D2, and the cathode K of the diode D2 is connected to the anode A of the diode D1. The smoothing capacitor C1 has a positive (+) terminal connected to the cathode K of the diode D1 and a negative (−) terminal connected to the anode A of the diode D2.

In this circuit, the rotation of the magnet plates 33 of the rotor 3 induces an alternating-current electromotive force in the power-generating coil 53. If the frequency determined by the spacings between the magnets of the magnet plate 33 and the number of revolutions matches the resonance frequency of the LC circuit, resonance of the LC circuit allows power to be efficiently obtained from the electromotive force induced in the power-generating coil 53.

By specifying the capacitance of the capacitor C0 and the inductance of the power-generating coil 53 such that the resonance frequency is close to the frequency determined by the standard speed, an overcurrent can be suppressed at a higher speed. The technical means for the configuration described above provides a series resonance circuit for improving the efficiency of power generation by the power-generating coil.

The configuration of the constant-current circuit 713b will be described next. The positive (+) terminal of the smoothing capacitor C1 is connected via the-resistor R1 to the collector (C) of the NPN transistor TR1, the base (B) of the NPN transistor TR2, and the positive (+) terminal of the capacitor C2. The negative (−) terminal of the smoothing capacitor C1 is connected to the negative (−) terminal of the capacitor C2, the emitter (E) of the transistor TR1, and one end of the resistor R2. The base (B) of the transistor TR1 is connected to the emitter (E) of the transistor TR2 and to the other end of the resistor R2. One output terminal of the constant-current circuit 713b is the positive (+) terminal of the smoothing capacitor C1, and the other output terminal is the collector (C) of the transistor TR2.

The functions of the bicycle headlamp according to the first embodiment and the headlamp electrical circuit 71 according to the second embodiment of the present invention will be described next with reference to FIGS. 18 to 20, on the basis of FIGS. 1 to 11 and FIGS. 15 to 17.

Figure 18:
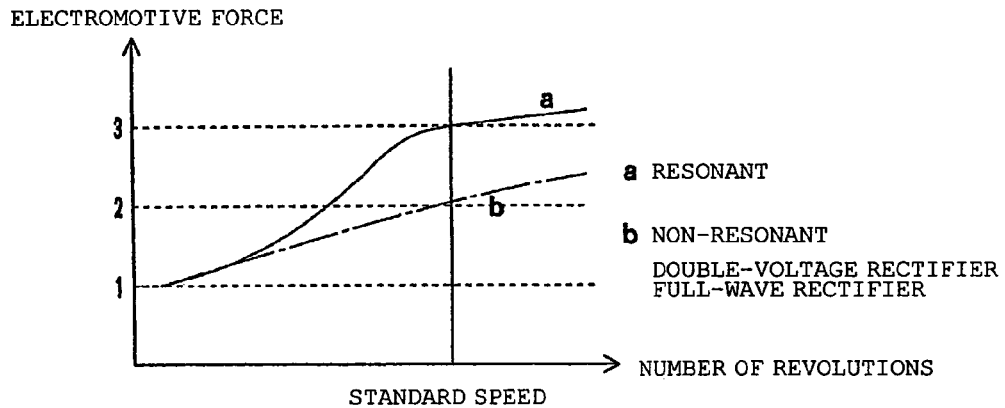
FIG. 18 is a view showing the comparison between a conventional non-resonant power-generation curve and a resonant power-generation curve obtained from the bicycle headlamp according to the first embodiment and the headlamp electrical circuit according to the second embodiment of the present invention: The horizontal axis indicates the number of revolutions, and the vertical axis indicates the electromotive force.

FIG. 18 is a view showing the comparison between a conventional non-resonant power-generation curve and a resonant power-generation curve obtained from the bicycle headlamp according to the first embodiment and the headlamp electrical circuit according to the second embodiment of the present invention: The horizontal axis indicates the number of revolutions, and the vertical axis indicates the electromotive force.

Figure 19:
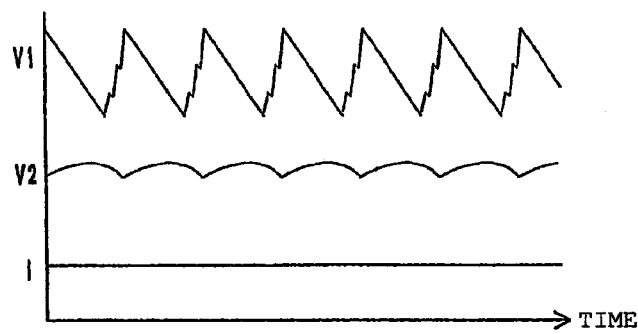
FIG. 19 is a waveform diagram showing voltage waveforms of different components of the headlamp electrical circuit according to the second embodiment, used with the bicycle headlamp according to the first embodiment of the present invention: The horizontal axis indicates time, and the vertical axis indicates voltage.

FIG. 19 is a waveform diagram showing voltage waveforms of different components of the headlamp electrical circuit according to the second embodiment, used with the bicycle headlamp according to the first embodiment of the present invention: The horizontal axis indicates time, and the vertical axis indicates voltage.

Figure 20:
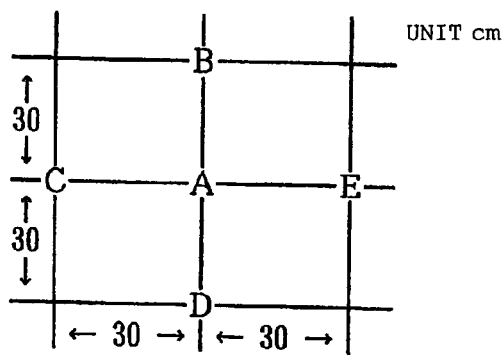
FIG. 20 is a view showing validity lines of the bicycle headlamp according to the first embodiment of the present invention.

FIG. 20 is a view showing validity lines of the bicycle headlamp according to the first embodiment of the present invention.

When the bicycle 9 travels, the wheels turn, rotating the rotor 3 including the magnet plates 33 disposed at particular spacings on the wheel spokes 91. This induces an electromotive force intermittently in the power-generating coil 53 of the stator 5. (When the magnet plate 33 of the rotor 3 faces the power-generating coil 53 of the stator 5, power is generated. When the space between the magnet plates 33 of the rotor 3 faces the power-generating coil 53 of the stator 5, no power is generated.)

The bicycle headlamp 1 and the headlamp electrical circuit 71 according to the present invention are configured so that the power-generating coil 53 of the stator, and the resonance circuit 711 formed of the power-generating coil 53 and the capacitor C0 establish series resonance at the standard speed of the bicycle 9. Therefore, the electromotive force induced in the power-generating coil 53 becomes as indicated by plot a in FIG. 18: The electromotive force surges while the speed increases from a low level to the standard level, and the increase in electromotive force becomes moderate after the standard speed is exceeded.

It is known that, in contrast, the conventional bicycle headlamp increases the electromotive force in proportion to the speed, as indicated by plot b in FIG. 18.

The electromotive force induced in the power-generating coil 53 of the stater 5 is stored in the smoothing capacitor C1, by the action of the diode D1 and the capacitor C0 and the action of the diode D2 and the smoothing capacitor C1. Voltage V1 across the ends of the smoothing capacitor C1 has characteristics as indicated by plot V1 in FIG. 19.

Because the direct-current output of the smoothing capacitor C1 is a voltage containing a large amount of ripple, as represented by plot V1 in FIG. 19, the output is supplied from the positive (+) terminal of the smoothing capacitor C1 via the resistor R1 to the positive (+) terminal of the capacitor C2, the collector (C) of the transistor TR1, and the base (B) of the transistor TR2, and is returned from the emitter (E) of the transistor TR1, the negative (−) terminal of the capacitor C2, and the other terminal of the resistor R2 to the negative (−) terminal of the smoothing capacitor C2.

A voltage V1 containing a large amount of ripple in the direct-current output passes through the resistor R1 and is integrated in the capacitor C2 having a small capacitance, and a phase lag is produced. The current flowing between the collector (C) and emitter (E) of the transistor TR2 is controlled by supplying the base (B) of the transistor TR2 with a ripple voltage V2 in opposite phase (see plot V2 in FIG. 19).

The current control is performed in opposite phase with a ripple voltage across the light-emitting diodes 73 connected in series with the collector (C) of the transistor TR2, so that the ripple of the current I flowing through the light-emitting diodes 73 connected in series is significantly reduced, as indicated by plot I in FIG. 19. The resistor, R2, connected between the emitter (E) of the transistor TR2 and the negative (−) terminal of the smoothing capacitor C1, causes negative feedback, which reduces the ripple further.

When the current flowing through the transistor TR2 increases to bring a voltage V3 across both ends of the resistor R2 above the cut-off voltage of the transistor TR1, a current flows through the transistor TR1, causing the resistor R1 to decrease the base voltage (V3) of the transistor TR2, thus decreasing the current flowing through the transistor TR2. Because the current flowing through the light-emitting diodes 73 is limited, the series-connected light-emitting diodes 73 can be protected from overcurrent.

It was determined whether the bicycle headlamp 1 according to the first embodiment of the present invention conforms to a Japanese Industrial Standard (JIS) standard on bicycle headlamps. A dc constant-current power supply and a light meter were used as test instruments complying with JIS C 9502. The test dc constant-current power supply supplied the light-emitting diodes 73 of the bicycle headlamp 1 with the same voltage and the same current provided by the headlamp electrical circuit 71. Illumination was measured by the test light meter placed in the positions shown in FIG. 20. In FIG. 20, position A was a direct extension of the axis of the lens, and positions B to E were 30 cm away from position A. The test light meter was placed in positions A to E to measure illumination.

When the light-emitting diodes 73 passed a current of 25 mA, the illumination at point A was 135 cd, the illumination at point B was 92.3 cd, the illumination at point C was 119 cd, the illumination at point D was 124 cd, and the illumination at point E was 121 cd. The illumination at points B to E averaged 114 cd.

When the light-emitting diodes 73 passed a current of 30 mA, the illumination at point A was 155 cd, the illumination at point B was 104 cd, the illumination at point C was 136 cd, the illumination at point D was 141 cd, and the illumination at point E was 138 cd. The illumination at points B to E averaged 130 cd.

The JIS standard specifies that the illumination at point A should be 400 cd or higher and that the illumination at points B to E should average 100 cd or higher. This means that the average illumination satisfies the requirement.

The JIS standard also specifies that the color of light emitted from the bicycle headlamp 1 should be white or pale yellow and should be as indicated in the JIS table. The bicycle headlamp according to the first embodiment of the present invention emits white light conforming to the JIS standard.

The bicycle headlamp 1 according to the first embodiment and the headlamp electrical circuit 71 according to the second embodiment of the present invention have the following advantages:

(1) The contactless generator enables power to be generated without frictional resistance, which is encountered by the conventional roller-type dynamo, and the cyclist's power needed during cycling can be significantly reduced.

(2) The capacitor C0 is connected in series with the power-generating coil 53 in order to establish series resonance at the standard cycling speed of the bicycle 9, with the result that the efficiency of power generation of the bicycle headlamp according to the present invention is 50% higher than that of the conventional non-resonant bicycle headlamp.

(3) Because the resonance frequency is specified corresponding to the standard cycling speed, the power generated at a cycling speed exceeding a certain level can be suppressed. The current is suppressed accordingly, and the light-emitting diodes 73 can be protected.

(4) Because the rectifying and smoothing circuit is configured to amplify the capacitance of the capacitor C1, the capacitance requirement is reduced to ⅒ or lower. Because a feedback circuit is provided, a current limit can be specified.

(5) The dome-shaped condenser lenses are aligned with the optical axes of the light-emitting diodes and focus light effectively, so that the bicycle headlamp 1 can provide an illumination of at least 5 lux in a circle having a radius of 30 cm at a distance of 5 m ahead of the bicycle at a standard cycling speed.

In addition, the bicycle headlamp according to the present invention can provide illumination sufficient for recognizing an object of about 10 cm at a distance of 10 m. The reflector 77b or 77c provided above the condenser lenses 75 by applying a treatment for producing diffused reflection makes it easier for other road users located ahead of the bicycle to notice the approach of the bicycle 9. This helps prevent traffic accidents.

(6) Because the stator 5 and the case 7 of the bicycle headlamp 1 according to the first embodiment are separated, the case 7 can be attached to a desired position, such as a handlebar.

Figure 21:
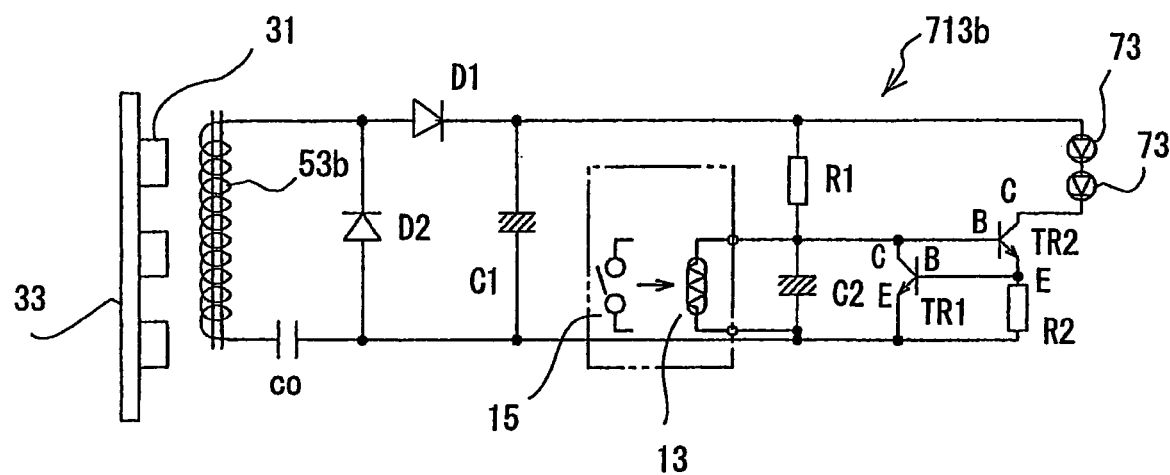
FIG. 21 is a schematic diagram showing the structure of a headlamp electrical circuit according to a third embodiment of the present invention, including a light sensor or a manual switch for turning the light on or off.

FIG. 21 is a schematic diagram showing the structure of a headlamp electrical circuit according to a third embodiment of the present invention, including a light sensor or a manual switch for turning the light on or off.

FIG. 21 shows that a light sensor 13 and/or a manual switch 15 is added to the constant-current circuit 713b of the rectifying and smoothing circuit 713.

In the constant-current circuit 713b, the light sensor 13 is connected between the base (B) of the transistor TR2 and the emitter (E) of the transistor TR1 connected via the resistor R2, or between the collector (C) and the emitter (E) of the transistor TR1. The transistor TR2 turns on or off in accordance with a sense signal from the light sensor. This allows or interrupts current supply to the light-emitting diodes 73.

In the constant-current circuit 713b, the manual switch 15 may be connected between the base (B) of the transistor TR2 and the emitter (E) of the transistor TR1 connected via the resistor R2, or between the collector (C) and the emitter (E) of the transistor TR1. The transistor TR2 turns on or off in accordance with the on/off signal sent from the manual switch. This allows or interrupts current supply to the light-emitting diodes.

In the constant-current circuit 713b, both the light sensor 13 and the manual switch 15 may be connected in series or in parallel, between the base (B) of the transistor TR2 and the emitter (E) of the transistor TR1 connected via the resistor R2, or between the collector (C) and the emitter (E) of the transistor TR1. The transistor TR2 turns on or off in accordance with either or both of the signal sent from the light sensor and the signal sent from the manual switch. This allows or interrupts current supply to the light-emitting diodes 73.

The headlamp electrical circuit according to the third embodiment enables automatic turn-on and turn-off, depending on the ambient light, and the manual switch 15 also enables on/off control as desired. Accordingly, no operation is required to start power generation.

Figure 22:
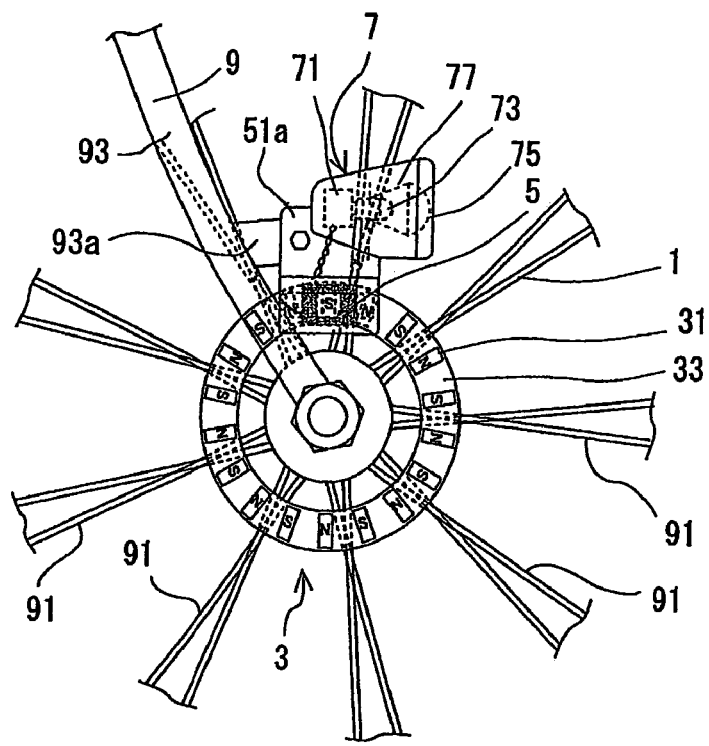
FIG. 22 is a side view of a bicycle headlamp according to a fourth embodiment of the present invention, showing the attached state of a ring-shaped magnet plate and the attached state of the headlamp.

FIG. 22 is a side view of a bicycle headlamp according to a fourth embodiment of the present invention, showing the attached state of a ring-shaped magnet plate and the attached state of the headlamp.

The fourth embodiment shown in FIG. 21 will be described using the same reference characters as shown in the first to third embodiments for the same members as used in the embodiments.

In the bicycle headlamp according to the fourth embodiment of the present invention, the rotor 3 has a ring-shaped magnet plate 33 attached to the wheel spokes 91 of the bicycle 9 along the circumference of the wheel, as shown in FIG. 22.

An electromotive force is continuously induced in the power-generating coil 53 of the stator 5. The power generated continuously can be appropriately averaged by the bicycle headlamp 1 according to the first embodiment and the headlamp electrical circuit 71 according to the second embodiment of the present invention. Therefore, the light-emitting diodes 73 can be continuously lit.

Figure 23:
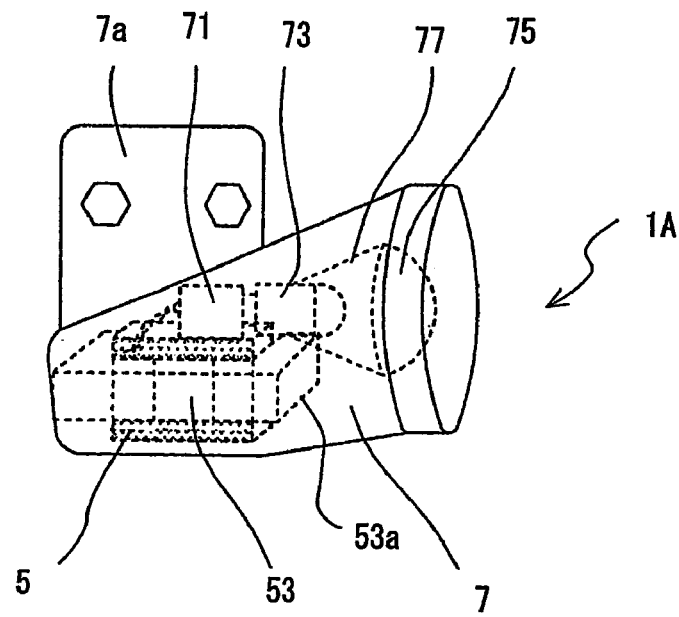
FIG. 23 is a perspective view showing a bicycle headlamp according to a fifth embodiment of the present invention.

FIG. 23 is a perspective view showing a bicycle headlamp according to a fifth embodiment of the present invention.

A bicycle headlamp 1A according to the fifth embodiment of the present invention includes an integral unit combining the stator 5 and the case 7, as shown in FIG. 23. The case 7 contains the stator 5 which includes the power-generating coil 53, the headlamp electrical circuit 71, the light-emitting diodes 73, the condenser lenses 75, and the reflector 77. A reference character 7a denotes a mounting block used to attach the headlamp on the fixed bracket 93a.

Because the stator 5 and the case 7 are combined, the integral bicycle headlamp 1A can be attached to existing position normally used for mounting the bicycle headlamp and can be easily replaced.

INDUSTRIAL APPLICABILITY

According to the present invention, the contactless generator as described above enables power to be generated without frictional resistance, which is encountered by the conventional roller-type dynamo, and the cyclist's power needed during cycling can thus be significantly reduced.

According to the present invention, a capacitor is connected in series with the power-generating coil in order to establish series resonance, with the result that the efficiency of power generation becomes 50% higher than that of the conventional non-resonant bicycle headlamp.

According to the present invention, the resonance frequency is specified corresponding to the standard cycling speed, so that the amount of current flowing at a cycling speed exceeding a certain level can be suppressed, and the light-emitting diodes can be protected.

According to the present invention, a constant-current circuit that can amplify the capacitance of the capacitor C1 is configured, so that smoothing can be appropriately performed even if a large ripple is present. In addition, a current limit can be specified at the same time.

According to the present invention, the lamp can be turned on or off automatically depending on the ambient light and can also be turned on or off when desired by a simple operation.

According to the present invention, the dome-shaped lens aligned with the optical axis of each light-emitting diode focuses light effectively, so that a certain level of illumination can be obtained in a circle at a specified distance.

The invention claimed is:

1. A bicycle headlamp comprising:
a rotor comprising a plurality of magnet plates attached to spokes of a bicycle wheel along the circumference of the wheel, each magnet plate having a form of an arc of a certain circle and comprising a plurality of magnets disposed at regular circumferential spacings with alternating south and north poles;
a stator comprising a power-generating coil comprising a coil and an iron core disposed in a fixed position to face the magnetic pole faces of the magnet plates of the rotor; and
a case separated from the stator, or for containing all of the stator, wherein the case contains at least a headlamp electrical circuit comprising a resonance circuit formed of the power-generating coil of the stator and a capacitor connected in series with the-power-generating coil, and having, as a resonant frequency, a power-generation frequency determined by the positions where the magnets and the power-generating coil are disposed, when the bicycle is pedaled at a predetermined speed, and a rectifying and smoothing circuit for rectifying, smoothing, and outputting electric power obtained from the power-generating coil of the resonance circuit, a plurality of light-emitting diodes that are lit by the electric power supplied from the headlamp electrical circuit, and a condenser lens for focusing light emitted from the plurality of light-emitting diodes in front of the bicycle and for illuminating the roadway,
wherein the lens is a dome-shaped lens disposed for each of the plurality of light-emitting diodes, the dome-shaped lens has a curvature, a diameter, and a thickness calculated to obtain a specified level of illumination in a specified circle at a specified distance by focusing light; and a reflector is provided on a flat-plate portion above the lens, by applying a treatment for producing diffused reflection, so that approaching of the bicycle can be noticed ahead of the bicycle.

2. A bicycle headlamp according to claim 1, wherein the stator, comprising the power-generating coil, the headlamp electrical circuit, the plurality of light-emitting diodes, and the condenser lens are contained in the case as a unit.

3. A bicycle headlamp according to claim 1, wherein the headlamp electrical circuit, the plurality of light-emitting diodes, and the condenser lens are contained in the case; and the stator, comprising the power-generating coil, is separately disposed outside the case.

4. The bicycle headlamp according to claim 1, wherein the predetermined speed is 15 km/h.

5. A bicycle headlamp according to claim 1, wherein the stator comprises the magnet plates attached to the spokes of the bicycle along the circumference of the wheel, in a continuous ring shape or in separate positions.

6. A bicycle headlamp according to claim 5, wherein the stator, comprising the power-generating coil, the headlamp electrical circuit, the plurality of light-emitting diodes, and the condenser lens are contained in the case as a unit.

7. A bicycle headlamp according to claim 5, wherein the headlamp electrical circuit, the plurality of light-emitting diodes, and the condenser lens are contained in the case; and the stator, comprising the power-generating coil, is separately disposed outside the case.

8. A bicycle headlamp according to claim 1, wherein the plurality of light-emitting diodes include a white light-emitting diode with a luminous intensity of 2 cd or higher, and the lens has a focal length such that a certain level of illumination is ensured at a specified distance.

9. A bicycle headlamp according to claim 8, wherein the stator, comprising the power-generating coil, the headlamp electrical circuit, the plurality of light-emitting diodes, and the condenser lens are contained in the case as a unit.

10. A bicycle headlamp according to claim 8, wherein the headlamp electrical circuit, the plurality of light-emitting diodes, and the condenser lens are contained in the case; and the stator, comprising the power-generating coil, is separately disposed outside the case.

* * * * *